United States Patent [19]

Ogawa

[11] Patent Number: 5,009,915
[45] Date of Patent: Apr. 23, 1991

[54] METHOD FOR PREPARING KONJAK CHIP

[75] Inventor: Ikuzo Ogawa, Kanagawa, Japan

[73] Assignee: Kabushiki Kaisha Maruzen Shokuhin, Kanagawa, Japan

[21] Appl. No.: 356,987

[22] Filed: May 25, 1989

[30] Foreign Application Priority Data

Mar. 6, 1989 [JP] Japan ................................. 1-052119

[51] Int. Cl.$^5$ .............................................. A23L 1/00
[52] U.S. Cl. ..................................... 426/615; 426/443
[58] Field of Search ............... 426/615, 574, 652, 443, 426/643, 641

[56] References Cited

U.S. PATENT DOCUMENTS

| | | | |
|---|---|---|---|
| 4,379,173 | 4/1983 | Masuyama | 426/549 |
| 4,393,086 | 7/1983 | Masuyama | 426/285 |
| 4,844,913 | 7/1989 | Ogawa | 426/52 |

FOREIGN PATENT DOCUMENTS

| | | | |
|---|---|---|---|
| 57-50863 | 3/1982 | Japan | 426/615 |
| 60-19459 | 1/1985 | Japan | 426/615 |
| 61-37082 | 2/1986 | Japan | 426/615 |
| 63-185345 | 7/1988 | Japan | 426/615 |
| 63-251063 | 8/1988 | Japan | 426/615 |

Primary Examiner—Donald E. Czaja
Assistant Examiner—D. Workman
Attorney, Agent, or Firm—Wegner, Cantor, Mueller & Player

[57] ABSTRACT

Disclosed is a composition containing a pulverized konjak chip being less than about 50 mm in length and 3 mm in width having been dehydrated to about 10–60% of its original weight, a process for its preparation, and dietary foodstuffs in which it is incorporated.

1 Claim, No Drawings

METHOD FOR PREPARING KONJAK CHIP

This invention relates to processed foodstuffs made from konjak. Particularly, it relates to konjak used to increase the amount of food fiber, and to lower calories, by mixing it into various foodstuffs as a substitute for meat or kneaded products.

Konjak is hardened glucomannan paste obtained from a bulb known as the "devil's tongue" belonging to the family *Colocasia antiquorum*. Typically, glucomannan powder is extracted from the bulb, e.g., as taught in U.S. Pat. Nos. 4,379,173 and 4,393,086, and mixed with water to form a paste, which, upon heating with an alkali material, such as sodium hydroxide, is hardened into a mass to form the food konjak. Various processed foodstuffs using konjak are known. Especially, it is known that various foodstuffs are made healthier when mixed with konjak because of konjak's food-fiber content and low calories.

For example, Japanese Patent No. 57-47460 and Japanese Patent No. 57-122764 disclose that palatable, variety products are obtained by mixing cut konjak or fine konjak into various foodstuffs. Japanese Patent No. 61-158759 discloses fractionalized konjak particles with fine branches provided on the surface thereof to facilitate connecting the konjak particles with meat. But, when these known forms of konjak are mixed into meat such as hamburg steak, 'Gyoza' (Chinese meat dish), or sausage, etc., the flavor and smell of konjak remain, making it easy to differentiate normal foodstuffs from konjak-containing foodstuffs. Because these known forms of konjak are merely cut pieces, the processed foodstuffs containing the konjak are just like imitation foodstuffs. Especially, in the case of a product such as hamburg steak, it is utterly impossible to get the same palatability as meat with only cut konjak because the elasticity and fiber of heat-cooked minced meat greatly influence its chewing sense, palatability, and swallowing sense etc. Furthermore, it is easy to detect these known konjak-containing products because the konjak used contains much water, and when the konjak is cooked with other foodstuffs, the water carries the smell of konjak to the foodstuffs. Improving only the shape of fractionalized konjak, these references were limited to uses with healthy foodstuffs. This is because the konjak is easily noticed in the foodstuff when the amount of konjak used increases above a certain degree, owing to the peculiarity of the konjak retained, no change in water content, and the elasticity and palatability of konjak.

Japanese Patent No. 61-37082 suggests that konjak can be added without causing movement of water from the konjak to meat etc., by dehydrating the konjak up to 90%. This is because water normally accounts for 97.3-99.0% of konjak, and the water content of foodstuffs like meat etc. is 60%. According to this teaching, movement of water from konjak to foodstuffs may be improved, but the palatability is the same as konjak that has not been dehydrated. And, if the granulated konjak in this reference is mixed into hamburg steak etc. and is heat-cooked, the konjak is still detectable when the amount of konjak used increases above a certain degree.

The present invention addresses the problems encountered in known products such as discussed above. Accordingly, the present invention furnishes a konjak chip, which is not easily detectable when added to foodstuffs, even when mixed into heat-cooked foodstuffs like hamburg steak, sausage, Gyoza, Shao-mai, kneaded products containing mashed fish, etc. The present invention also furnishes a process for making the konjak chip, and various processed foodstuffs incorporating this konjak chip.

The konjak chip of the present invention is preferably obtained by pulverizing konjak between revolving whetstones or millstones to form chips of 1-50 mm in length and 0.5-3 mm in width, and then dehydrating the chips to between 10-60% of their original weight. Accordingly, the konjak chip of this invention has an uneven surface created by pulverizing, as compared with only splintered konjak or particulate konjak. This unevenness permits the konjak chip to adhere to foodstuffs and seasoning that are mixed with the konjak chip. Simultaneously, as compared with known forms of konjak, the same palatability as meat contained in heat-cooked foodstuffs is attained by dehydrating the chips.

The vertically aligned revolving whetstones effect unevenness in the surface of the konjak chips produced during mashing because of the chinks found on the opposing surfaces of the whetstones. Besides, since dehydration in konjak is accelerated with pressing power between revolving whetstones, the dehydrating process, which can be performed by boiling or steaming the pulverized konjak, can be performed efficiently. Moreover, this dehydration process effects a palatability in the konjak more closely resembling that of meat by hardening the surface of the konjak chip in addition to reducing the smell of konjak.

One processed foodstuff containing konjak in accordance with this invention is hamburg steak. Meat, pigments, and seasoning, at 0-100% by weight konjak are mixed with the konjak chips. In the hamburg steak containing konjak of the present invention the hamburg steak cannot be discriminated from the konjak chips, even if the konjak content is greater than meat. The addition of pigments prevents lightening of the natural meat color owing to the existence of the konjak chips, and so it is possible to obtain the same appearance as normal hamburg steak.

Another processed foodstuff containing konjak in accordance with this invention is sausage. Meat, pigments, and seasoning, at 0-100% by weight konjak are mixed with the konjak chips. In the sausage containing konjak of the present invention the sausage cannot be discriminated from the konjak chips, even if the konjak content is greater than meat. The addition of pigments prevents lightening of the natural meat color owing to the existence of the konjak chips, and so it is possible to obtain the same appearance as normal sausage. Optionally, raw konjak paste is added to the sausage. The raw konjak paste acts as an adhesive material between the konjak chips and the sausage, and so it is possible to obtain konjak-containing sausage having no rough feeling.

Another processed foodstuff containing konjak in accordance with this invention is "Gyoza," a Chinese food containing meat and vegetables. Meat, vegetables, and seasoning at 0-100% by weight konjak are mixed with the konjak chips. In the Gyoza containing konjak of the present invention the Gyoza cannot be discriminated from the konjak chips, even if the konjak content is greater than meat.

Another processed foodstuff containing konjak in accordance with this invention is "Shao-mai," a Chinese food containing meat and vegetables. Meat, vegetables, and seasoning at 0-100% by weight konjak are mixed with the konjak chips. In the Shao-mai containing konjak of the present invention the Shao-mai cannot be discriminated from the konjak chips, even if the konjak content is greater than meat.

Another processed foodstuff containing konjak in this invention is a kneaded product containing mashed fish. The kneaded product containing mashed fish is mixed with the konjak chips at 30–300% by weight konjak along with seasoning. The konjak chips are preferably pulverized under 1 mm in length and in width. The konjak chips in these kneaded products unites completely with the mashed fish, and the fish and konjak cannot be distinguished. The elasticity caused by the dehydration rate of the konjak chips is similar to the hard-chewing palatability of the kneaded products, so the existence of konjak is not detected in the palatability.

Another processed foodstuff containing konjak in accordance with this invention is konjak for "rice-in-tea." The konjak chips are boiled in a seasoning soup until the seasoning soup is reduced. Konjak for rice-in-tea according to this invention uses konjak chips dehydrated to 10–60% of their original weight, so the seasoning soup fully permeates the konjak chips, and water content is low as compared with normally boiled konjak. Therefore, in the rice-in-tea, the nature of konjak does not arise, and it is possible to obtain a palatability having a new taste.

As mentioned above, according to this invention, konjak of raw materials is pulverized to a chip state, and is dehydrated up to 60–10% by weight konjak of raw materials. Therefore, it is possible to furnish konjak chips having a palatability like meat when the konjak chips are mixed into heat-cooked foodstuffs.

And, according to this invention, the konjak chips are produced by using revolving whetstones. Therefore, it is possible to form unevenness easily on the surface of the chips that is suitable for combining with other foodstuffs. Simultaneously, the present invention provides for a production method that can effectively perform dehydration.

Moreover, by mixing the konjak chips into various foodstuffs, it is possible to furnish processed foodstuffs of excellent health-food, wherein the processed foodstuffs have the food-fiber of konjak, and can be eaten like normal foodstuffs without noticing the addition of konjak.

The following non-limiting examples are presented to more clearly describe the present invention. All parts and percentages in the examples are by weight unless indicated otherwise.

EXAMPLE 1

Konjak chips are prepared in accordance with the present invention.

1. raw materials

The konjak of raw materials used is any konjak produced by the following method. The original shape of the konjak does not matter as long as it can be fed into the pulverizing apparatus.

Packing under raw condition: Ground powder of konjak potato (or grated konjak potato under raw condition) and water are stirred completely, wherein the ratio of ground powder to water is 1 to 28–45. After stirring, the mixture is left as it is for about 40 minutes–2 hours to form a paste. The temperature of the water during stirring is set at about 13°–35° C. The paste material is placed into a kneading machine, and is kneaded after adding a coagulant, such as a KOH solution etc., at a ratio of 6–10%. The kneaded material is packed into a bag with an auto-packing machine, wherein the bag has a fixed shape and is made of plastic film. The packed kneaded material is boiled in a forming machine at a temperature of 60°–80° C. for about 5–15 minutes to obtain the raw konjak product.

The "ODO" method: Alternatively, the raw konjak is prepared using the "ODO method," which contains a handmade element. Pretreatment of raw materials is the same as in the packing under raw condition process, wherein the temperature of water is 15°–60° C., the setting time is for 30 minutes–2 hours. After setting, the paste material is placed into the kneading machine, and the coagulant is added. Then the paste material is poured into a forming frame, and is left as it is for about 10 minutes–1 hour until the paste material is hardened. The hardened konjak is cut into a suitable size, and is put into a water tank filled with hot water at 60°–80° C., wherein the coagulant at 6–10% is added. In this manner, the raw konjak product obtained is further hardened.

Steaming in a can: Pre-treatment of raw materials, the water temperature, the setting time, and processing, i.e., from placing into the kneading machine to addition of the coagulant, are the same as the packing under raw condition. After adding the coagulant, the paste material is poured into a can frame, capped and put into a water tank, and steamed with hot water at 60°–90° C., for about 1–8 hours. After steaming, the hardened raw konjak product is taken from the can.

In the foregoing manner, it can be seen that there are various methods for preparing konjak of raw materials. In the present invention, konjak produced by any of these methods can be used as raw materials. Optionally, konjak powder containing flour (starch etc.) at about 10% konjak can be used as raw materials as well as konjak containing pigments, soybean protein, red pepper, mustard, seaweed powder, green laver, sesame, other vegetables, etc.

2. pulverizing process

Pulverizing is performed by supplying konjak of raw material between two vertically oriented, horizontally revolving whetstone disks. On the opposing surfaces of the revolving whetstones, many chinks of 8–15 mm in width, 3–15 mm in depth are formed from the center to the outside circuit, with each angles at every fixed range. Raw materials thrown from the revolving center of the whetstones are ejected to the outside circuit thereof while being mashed between the whetstones.

In this case, the desirable interval between the vertically oriented revolving whetstones is 0.4–1.6 mm. If the interval is under 0.4–1.6 mm, the grain of konjak chip produced is too fine to obtain a palatability like that of meat. If the interval is above 0.4–1.6 mm, the grain of konjak chip is too rough to deny the nature of konjak in konjak-containing foodstuffs.

Moreover, the desirable revolution rate of the whetstones is 750–1500 rpm. The rate of 750–1000 rpm is suitable for obtaining a konjak chip such as a chained ribbon. The rate of 750–1200 rpm is suitable for obtaining a rough konjak chip, and the rate of 900–1500 rpm is suitable for obtaining a fine konjak chip.

An pulverizing apparatus on the market using revolving whetstones that is useful in accordance with the present invention is available from Masuyuki Industry Corporation, 1-12-24 Honcho, Kawaguchi-shi, Saitama, Japan under the name Masucolloidar.

3 steaming process

The konjak chips produced in the pulverizing process are steamed in a steamer or boiled in water at a temperature of 80°–100° C. for 3–5 minutes. The steaming step covers boiling and steaming. In this steaming process, the konjak chip is deodorized. If the konjak chip is not deodorized, the smell of konjak remains when this konjak chip is mixed into other foodstuffs, and so the presence of konjak is easily determined. And, in this steaming process, the surface of the konjak chip is hardened, so this process is important to obtain a palatability having superior elasticity as well.

4. dehydrating process

After steaming, the konjak chips are dehydrated at 10–60% by weight konjak of raw materials with a dehydrator, such as a centrifugal dehydrator, etc. The time of dehydration depends on the ability of dehydrator, but the normal time is about 30–90 seconds. The amount of this dehydration is quite important to obtain the konjak chip of this invention. In dehydration which is about 90% by weight, the palatability of the konjak chip is different from that of heat-cooked meat. While, when the konjak chip is dehydrated under 10% by weight, it becomes dry and rough, and lacks elasticity, and so such a konjak chip is not suitable for foodstuffs. Accordingly, the konjak chip of the present invention can be obtained by processing the above-mentioned raw materials as set forth above.

EXAMPLE 2

Hamburg steak is prepared in accordance with the present invention.

(1) materials

Materials used for making the hamburg steak are recorded in the following Table 1.

TABLE 1

| material | proper quantity (g) |
|---|---|
| konjak chip | 560 |
| minced meat - mixed beef and pork | 100-225-300 |
| onion | 100-160-200 |
| essence of beef | 35-100 |
| pigments | 5-10-30 |
| egg white | 10-20-50 |
| flour | 15-24-40 |
| suet | 5-30 |
| seasoning | |
| chemical seasoning | 5-20 |
| sugar, sweetening | 10-16-30 |
| spice | 10-12-30 |
| salt | 1-6-10 |
| "mirin" (Japanese seasoning) | 10-20-50 |
| other seasonings | suitable quantity |
| cold water | 100-160-250 |

The materials used as above are further described in the following Table 2.

TABLE 2

| essence of beef | liquid or granular |
|---|---|
| pigments | red 'koji' pigment, red-color No. 2, aluminum lake No. 2, No. 3, aluminum lake No. 3, No. 102, No. 104, No. 105, No. 106 |
| egg white | liquid or granular |
| sugar sweetening | refined sugar, muscovado, granulated sugar saccharin sodium, aspartame |
| chemical seasoning | |
| amino acid system | DL-Alanin, Glycin L-sodium glutamate |
| nucleic acid system | 5'-inosinic acid disodium 5'-guanylic acid disodium 5'-ribonucleosid disodium |
| organic acid system | succinic monosodium |

TABLE 2-continued

| | malic acid sodium |
|---|---|
| other seasonings | various spice, oils and fats, dairy products, sauce, according to taste |

2. production method

First, konjak chips and essence of beef are mixed. Then, since the konjak chips are tasteless and scentless, a liquid essence of beef is used. If the essence of beef is granular, the mixture of konjak and an essence is parched after mixing, and is fully cooled.

Secondly, pigments, onion, spice, chemical seasoning, "mirin," sugar or sweetening, and salt are added to the mixture and parched. The time of parching is for 3–5 minutes. If the time is shorter, too much water remains. If the time is longer, the mixture loses too much water. Therefore, the time of parching is carefully monitored, since it is hard to mix in the next step. Preferably, the mixture is parched until the weight shows a decrease of 5–15%. After parching, the mixture is left as it is in a refrigerator (0°–5° C.) to cool it.

Next, flour, egg white, suet, minced meat of mixed beef and pork are added to the material and mixed for about 5–10 minutes. Then, cold water is added while observing toughness of the mixture. The finished material is left as it is in a refrigerator for about 20–30 minutes. The material can then be form like ordinary hamburg steak and roasted. The method of roasting is the same one as roasting normal hamburg steak, e.g., roasting for 17–20 minutes maintaining the temperature at 100° C., for 12–15 minutes at 150° C., or for 7–10 minutes at 200° C.

EXAMPLE 3

Sausage is prepared in accordance with the present invention.

1. materials

Materials used in making the sausage are recorded in the following Table 3.

TABLE 3

| material | property quantity (g) |
|---|---|
| konjak chip | 370 |
| minced meat - mixed beef and pork | 100-262-400 |
| onion | 20-30-50 |
| essence of beef | 10-30-60 |
| pigments | 5-10-30 |
| seasoning | |
| chemical seasoning | 1-5-20 |
| sugar, sweetening | 10-14-30 |
| spice | 1-5-30 |
| salt | 1-5-20 |
| 'mirin' | 20-38-100 |
| others | suitable quantity |
| raw konjak paste | 30-62-80 |
| egg white | 10-19-45 |
| flour | 20-30-50 |
| lard | 10-27-35 |
| intestines of sheep, or artificial casing | |
| cold water | 100-160-300 |

Raw konjak paste is produced by adding 3% ground powder of konjak for 1 liter water. No coagulant is added to the raw konjak paste.

2. production method

First, konjak chips of raw materials are prepared as in Example 1. As compared with hamburg steak, a finer konjak chip is suitable for raw materials. The preferable size is under 1 mm. An essence of pork is added to the konjak chips, and mirin, pigments, grated or smashed onion, sugar or sweetening, chemical seasoning, and salt are mixed. Then the mixture is parched. The suitable time of parching is for 3-5 minutes as in the case of hamburg steak. After parching, the mixture is left as it is in a refrigerator to cool it.

Starch, raw konjak paste, minced meat of mixed beef and pork, lard, spice, and egg white are added to the cooked material, and the mixture is mixed for 5-10 minutes. Cold water is added during mixing to tenderize the whole mixture slightly, as compared with hamburg steak, while considering the casing. The finished mixture is left in a refrigerator to cool.

The mixed material is packed into the sheep intestines or artificial casing. After packing, the material is smoked, steamed, or boiled. When an artificial casing is used, the following conditions of time and temperature are maintained.

drying ... for 10-15 minutes, at 65°-70° C.
smoking ... for 15-10 minutes, at 70°-75° C.
steaming ... for 20-30 minutes, at 70°-80° C.

The steamed or boiled material is quickly cooled with cold water, and then fully cooled throughout the material in a refrigerator overnight to create the finished product.

EXAMPLE 4

Gyoza is prepared in accordance with the present invention.

1. materials

Materials used in preparing the Gyoza are recorded in the following Table 4.

TABLE 4

| material | proper quantity (g) |
|---|---|
| konjak chips | 850 |
| minced meat of pork | 100-200-400 |
| vegetables | 300-1000-1500 |
| essence of pork seasoning | 10-50-80 |
| chemical seasoning | 5-10-30 |
| sugar, sweetening | 5-20-50 |
| soy | 5-15-50 |
| salt | 5-30 |
| 'mirin' | 5-15-35 |
| others | suitable quantity |
| flour | 30-50-70 |
| lard | 10-20-35 |
| cold water | 50-180-200 |

2. production method

The preferable konjak chips used for gyoza containing meat are 1-3 mm in length. An essence of pork is added to these konjak chips, and mirin, sugar or sweetening, chemical seasoning, soy, and salt are mixed. Then the mixture is parched for 3-5 minutes. The parched material is left as it is in a refrigerator to cool it.

Next, vegetables such as cabbage, onion, leek, garlic, 'shiitake' (Japanese mushroom), flour, minced meat of pork, and lard are mixed into the cooled material, and cold water is added according to toughness. The finished material is left as it is in a refrigerator for about 30 minutes. After being left in the refrigerator, the material is formed by wrapping up in a film for gyoza. Then the formed material is steamed for 8-10 minutes at 80°-100° C. to create the finished product.

Alternatively, gyoza containing vegetables are produced by mixing green-colored konjak chips and an essence of vegetables. The preferable ratio of konjak chips to meat is 8 to 2, and the producing method is the same as the case of Gyoza containing meat.

EXAMPLE 5

Shao-mai is prepared in accordance with the present invention.

1. materials

Materials used in preparing the shao-mai are recorded in the following Table 5.

TABLE 5

| material | proper quantity (g) |
|---|---|
| konjak chips | 900 |
| minced meat of pork | 100-200-400 |
| vegetables | 300-700-1500 |
| essence of pork | 3.5-40-50 |
| chemical seasoning | 1-4-10 |
| sugar, sweetening | 5-20-90 |
| soy | 10-15-30 |
| salt | 1-10-15 |
| 'mirin' | 10-15-40 |
| flour | 10-30-50 |
| lard | 10-30-65 |
| cold water | 50-180-200 |

2. production method

In producing Shao-mai, the method is the same as the case of gyoza containing meat. The preferable konjak chips are 1-2 mm in length. An essence of pork is added to this konjak chips, and mirin, sugar or sweetening, chemical seasoning, soy, and salt are mixed. Then the mixture is parched for 3-5 minutes. The parched material is left as it is in a refrigerator to cool it.

Next, flour, minced meat of pork, vegetables, and lard are added to the cooled material, and cold water is added, and the mixture is mixed up to reach fixed toughness. The finished material is left as it is in a refrigerator for about 30 minutes.

After being left in the refrigerator, the material is formed by wrapping up in a film for shao-mai. Then the formed material is steamed for 8-10 minutes at 80°-100° C. to create the finished product.

Alternatively, shao-mai containing shrimp or scallops is made by replacing all or part of the pork in the shao-mai containing meat for shrimp or scallops.

EXAMPLE 6

A kneaded product (boiled fish paste) is prepared in accordance with the present invention.

1. materials

Materials for preparing the kneaded product are recorded in the following Table 6.

TABLE 6

| material | proper quantity (g) |
|---|---|
| konjak chips | 200 |
| mashed fish seasoning | 400 |
| chemical seasoning | 1-5-10 |
| 'sake' | 10-20-30 |
| sugar, sweetening | 10-20-30 |
| salt | 1-10-10 |
| 'mirin' | 5-10-20 |
| others | suitable quantity |
| starch | 30-50-70 |
| egg white | 20-35-50 |
| cold water | 50-75-80 |

2. production method

First, konjak chips and mashed fish are mixed, and the mixture is ground medially with meat chopper.

Next, starch, egg white, sugar, mirin, and sake (rice wine) are mixed into this ground mixture, and cold water is added to the mixture according to toughness. This cold water is also effective for the purpose of lowering the temperature in mixing. The finished material is left as it is in a refrigerator for 20-30 minutes, and then formed. The formed material is steamed or broiled with a broiler, under the following conditions to obtain the final product.

| steaming | at 80-100° C. for 5-8 minutes |
| --- | --- |
| broiling | at 120-180° C. for 8-15 minutes |

EXAMPLE 7

Konjak for rice-in-tea is prepared in accordance with the present invention.

1. materials

Material used in preparing the rice-in-tea are recorded in the following Table 7.

TABLE 7

| material | proper quantity (g) |
| --- | --- |
| konjak chips | 400-500-600 |
| 'kombu' (tang) boiled with water | 80-100-120 |
| beef (used for taste of beef) | 100 |
| short-necked clams (used for taste of short-necked clams) | 100 |
| scallops (used for taste of scallops) | 100 |
| red cayenne pepper (used for taste of red pepper) | 150 |
| dried shiitake (used for taste of shiitake and kombu) a little | 50 |
| ginger (used for taste of beef or short-necked clams) | |
| white sesame | 20 |
| seasoning | |
| soy | 350 |
| sugar | 300 |
| mirin | 200 |

TABLE 7-continued

| material | proper quantity (g) |
| --- | --- |
| others | suitable quantity |

2. producing method

First, seasoning soup is prepared beforehand by mixing seasoning. Next, in the case of taste of beef, konjak chip, kombu boiled with water, fine beef, and chopped ginger are soaked in the seasoning soup. The soaked materials are cooked over a medium fire for 20-30 minutes until seasoning soup is running short. Then white sesame is sprinkled on the cooked material to obtain the completed product.

In the cases of the taste of short-necked claims, scallops, and red pepper, the same method is performed by using each material.

In the case of the taste of "kukiwakame" seaweed, normal konjak is cut 1-2 cm in length, 1 cm in width, 2-3 mm in thickness, and is steamed (boiled) to remove the smell of lime. Then the steamed konjak and konjak chips are added to the prepared seasoning soup, and are cooked over a medium fire for 30-40 minutes until seasoning soup is running short. Lastly, white sesame is sprinkled on the cooked material to obtain the completed product.

In the case of the taste of shiitake and kombu, normal konjak is cut 2-3 cm in length, 1-1.5 cm in width, and 1-1.5 mm in thickness and is steamed. Then konjak chips, fine dried shiitake, and seasoning soup are added to the steamed konjak. The mixture is cooked over a medium fire until seasoning soup is running short. Last, white sesame is sprinkled on the cooked material to obtain the completed product.

I claim:

1. A process for making a konjak chip comprising the steps of:
   (a) pulverizing konjak between vertically oriented revolving whetstones to about 1-50 mm in length and 0.5-3 mm in width;
   (b) deodorizing the pulverized konjak by steaming or boiling; and
   (c) dehydrating the deodorized konjak to about 10-60 % of its original weight.

* * * * *